United States Patent
Fujii et al.

(10) Patent No.: US 7,022,384 B2
(45) Date of Patent: *Apr. 4, 2006

(54) REFLECTIVE FILM, REFLECTION TYPE LIQUID CRYSTAL DISPLAY, AND SPUTTERING TARGET FOR FORMING THE REFLECTIVE FILM

(75) Inventors: Hideo Fujii, Kobe (JP); Junichi Nakai, Kobe (JP); Takashi Onishi, Kobe (JP); Katsutoshi Takagi, Kobe (JP)

(73) Assignee: Kabushiki Kaisha Kobe Seiko Sho (Kobe Steel, Ltd.), Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/223,368

(22) Filed: Aug. 20, 2002

(65) Prior Publication Data

US 2003/0143342 A1    Jul. 31, 2003

(30) Foreign Application Priority Data

Jan. 25, 2002    (JP) .............................. 2002-017249

(51) Int. Cl.
    *C22C 5/06*    (2006.01)

(52) U.S. Cl. .................. 428/1.62; 428/1.1; 353/37; 353/50; 359/360; 420/83; 420/416

(58) Field of Classification Search ............... 428/1.62, 428/1.1, 1, 62; 353/37, 50; 359/360; 420/83, 420/416

See application file for complete search history.

(56) References Cited

U.S. PATENT DOCUMENTS

| 3,087,831 | A | * | 4/1963 | Browne ...................... 428/434 |
| 5,093,174 | A | * | 3/1992 | Suzuki et al. ............... 428/64.3 |
| 5,500,301 | A | | 3/1996 | Onishi et al. ................ 428/457 |
| 5,514,909 | A | | 5/1996 | Yamamoto et al. .......... 257/765 |
| 5,667,853 | A | * | 9/1997 | Fukuyoshi et al. ......... 428/1.62 |
| 5,976,641 | A | | 11/1999 | Onishi et al. ................. 428/1.3 |
| 6,007,889 | A | | 12/1999 | Nee ........................... 428/64.1 |
| 6,033,542 | A | | 3/2000 | Yamamoto et al. .... 204/298.13 |
| 6,096,438 | A | | 8/2000 | Takagi et al. ............ 428/472.2 |
| 6,206,985 | B1 | | 3/2001 | Onishi et al. ................ 148/437 |
| 6,280,811 | B1 | | 8/2001 | Nee .......................... 428/64.11 |
| 6,333,267 | B1 | | 12/2001 | Onishi et al. ............... 438/638 |
| 6,387,536 | B1 | | 5/2002 | Takagi et al. ............... 428/620 |
| 6,689,444 | B1 | * | 2/2004 | Nakai et al. ............... 428/64.1 |
| 2003/0143342 | A1 | | 7/2003 | Fujii et al. |

FOREIGN PATENT DOCUMENTS

JP    05-210880    8/1993
JP    2001-350142    12/2001

OTHER PUBLICATIONS

Rare-earth metals, Columbia Electronic Encyclopedia, 6th ed. 2003, Columbia University Press.*
Li et al. Structure and Properties of AgLaY Alloy, Journal of Rare Metals, 2001, vol. 20(3), pp 192-196.*

(Continued)

*Primary Examiner*—Harold Pyon
*Assistant Examiner*—Sow-Fun Hon
(74) *Attorney, Agent, or Firm*—Oblon, Spivak, McClelland, Maier & Neustadt, P.C.

(57) ABSTRACT

A reflective film used as a reflective electrode or a reflector, comprising an Ag-based alloy containing rare earth metals. The reflective film has high reflectivity and high durability.

22 Claims, 6 Drawing Sheets

OTHER PUBLICATIONS

Werts, Rare Earth Elements, Lanthanides in the Periodic Table, Luminescent Lanthanides, 2002, http://perso.wanadoo.fr/mhvwerts/lanthanides/.*
U.S. Appl. No. 10/971,142, filed Oct. 25, 2004, Nakai et al.
U.S. Appl. No. 10/870,996, filed Jun. 21, 2004, Nakai et al.
U.S. Appl. No. 10/223,368, filed Aug. 20, 2002, Fujii et al.
U.S. Appl. No. 10/999,027, filed Nov. 30, 2004, Takagi et al.
U.S. Appl. No. 11/103,615, filed Apr. 12, 2005, Takagi et al.
U.S. Appl. No. 11/158,027, filed Jun. 22, 2005, Tauchi, et al.
U.S. Appl. No. 11/168,497, filed Jun. 29, 2005, Takagi, et al.

* cited by examiner

REFLECTIVE FILM, REFLECTION TYPE LIQUID CRYSTAL DISPLAY, AND SPUTTERING TARGET FOR FORMING THE REFLECTIVE FILM

BACKGROUND OF THE INVENTION

1. Field of the Invention

The present invention relates to a reflective film to be used, for instance, in a reflection type liquid crystal display and for reflecting room light, natural light, etc. on a backside and using this as a light source. In particular, the invention relates to a reflective film having high reflectivity and exhibiting high durability such as anti-oxidation property, and also to a reflection type liquid crystal display using the reflective film and being brighter and easier to look at, and a sputtering target for forming the reflective film.

2. Description of the Related Art

Liquid crystal displays can be classified to a reflection type and a transmission type. The transmission type liquid crystal display must have a lamp as a light source incorporated in it. Because of high power consumption of the lamp, attention is now focused on a reflection type liquid crystal display, which requires no lamp in it and consumes less power.

In the reflection type liquid crystal display, a reflective film is necessarily provided as a reflective (metal) electrode on the backside of a liquid crystal layer of TFT liquid crystal panel or as a reflector on the backside of a transparent electrode of an STN liquid crystal panel. Room light, natural light, etc. are reflected by the reflective film, and it is used as the light source for forming an image. In order to obtain a bright and clear liquid crystal display panel, it is required to increase the reflectivity of the reflective film.

In the past, aluminum thin-film has been used as the reflective film. Aluminum is subject to corrosion due to salt or moisture, and reflectivity is gradually decreased. For this reason, a thin-film mainly comprising Ag is now used.

However, when Ag thin-film is exposed to the air for a long time in the manufacturing process of the liquid crystal display or when it is exposed to a high temperature and high humidity conditions, oxidization of Ag film, Ag grain growth, or coalescence of Ag occurs. This leads to the decrease in reflectivity, and initial high reflectivity of Ag is not sufficiently maintained.

SUMMARY OF THE INVENTION

It is an object of the present invention to provide a reflective film for a high-performance reflection type liquid crystal display, by which it is possible to improve anti-oxidation property while maintaining initial high reflectivity of Ag and to find out an Ag-base alloy, which can prevent the grain growth of Ag or the coalescence of Ag atoms to the utmost extent.

It is also an object of the present invention to provide a reflection type liquid crystal display using this reflective film, and also to provide a sputtering target for forming the reflective film.

To solve the above problems in one preferred aspect, we utilize the reflective film used as a reflective electrode or a reflector comprises an Ag-base alloy, which contains rare earth metals.

By the use of rare earth metals, it is possible to obtain a reflective film, which has reflectivity of the same level as the initial reflectivity of Ag and has less changes of reflectivity over time. Also, it provides the effect to suppress grain growth of Ag or to suppress coalescence of Ag atoms. Therefore, the reflective film is preferably used as a reflective electrode or a reflector of the reflection type liquid crystal display. When at least one element of rare earth metals is contained in the film in an amount of 0.1% to 3.0%, it is preferable because a higher effect can be provided to suppress grain growth of Ag or coalescence of Ag atoms. As the rare earth metals, Nd and/or Y are preferably used.

When the Ag-base alloy as described above contains Au in an amount of 0.1% to 1.5% or when it contains Cu in an amount of 0.1% to 2.0%, it is possible to obtain a reflective film having a high anti-oxidation property.

In another aspect, we utilize a reflection type liquid crystal display with the reflective film as described above and also a sputtering target for forming the reflective film, which comprises Ag-base alloy and is used for forming the reflective film on a substrate.

Other and further objects, features and advantages of the invention will appear more fully from the following description.

DETAILED DESCRIPTION OF THE PREFERRED EMBODIMENTS

Figure 1:
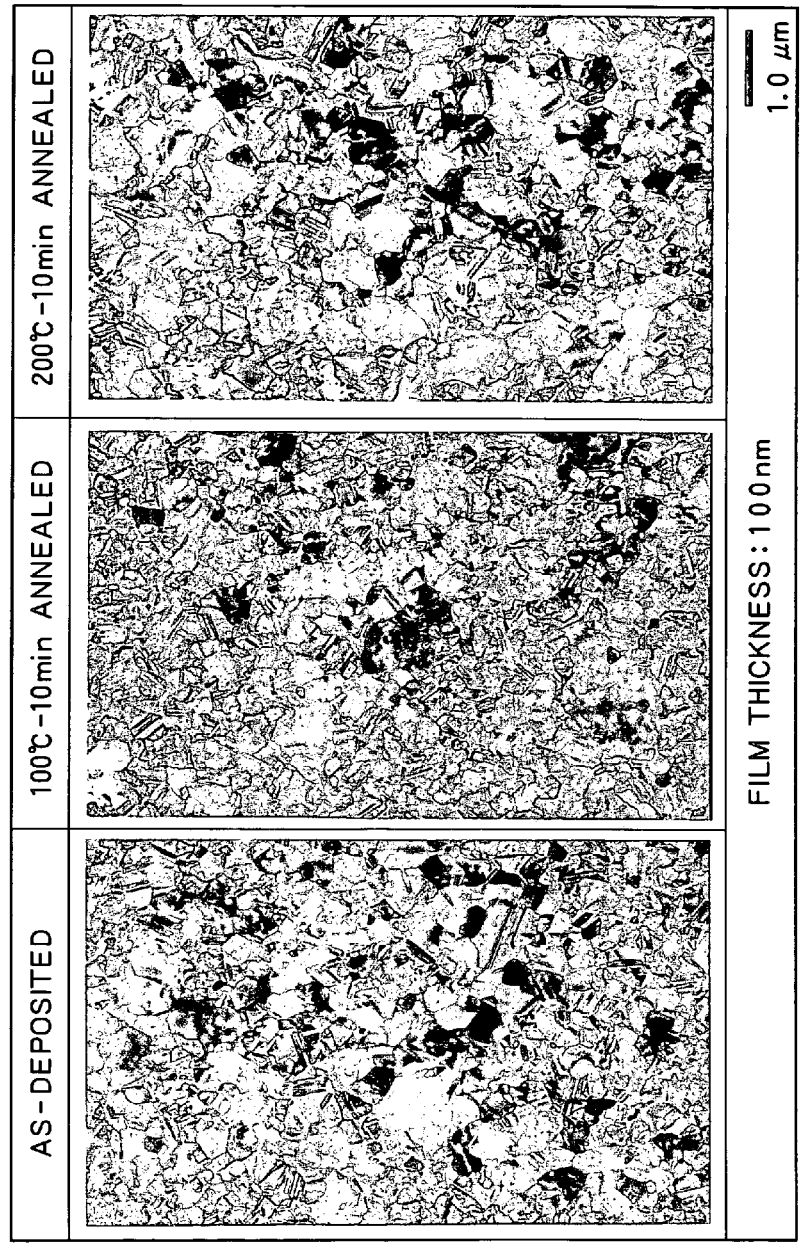
FIG. 1 represents transmission electron micrographs (TEM) images showing microstructure of a pure Ag thin-film.

With the purpose of positively studying and identifying the phenomenon, which occurs when the reflective film is exposed to the air in the process to manufacture the liquid crystal display, the present inventors performed an experiment as follows: A reflective film composed of Ag only (1500 Å in thickness) was left under high temperature and high humidity conditions (80° C. and 90% relative humidity) for 48 hours. As a result, it was found that the reflectivity decreased by about 7.0% compared with the initial reflectivity (wavelength: 650 nm) before the experiment. The decrease in reflectivity over time may be attributed to the causes such as coalescence of Ag atoms, grain growth, oxidation, etc. In order to suppress the decrease in reflectivity over time while maintaining the initial high reflectivity of Ag, the type of alloy components is a very important factor.

In the present invention, by the use of Ag-base alloy containing rare earth metals, the decrease in reflectivity over time has been successfully suppressed by limiting the coalescence of Ag atoms or grain growth while maintaining the initial high reflectivity of Ag.

Attempts have been made to use not only pure Ag but also Ag-base alloy as the reflective film. However, in the prior art, there have been no findings, which disclose the addition of rare earth metals to Ag for the purpose of limiting the coalescence of Ag atoms or the grain growth as defined in the present invention. On the other hand, according to the present invention, an Ag-base alloy containing rare earth metals is used as the reflective film, and this makes it possible to maintain high reflectivity by suppressing the decrease in the reflectivity over time. Thus, it is based on a technical concept, which is apparently different from the concept of the prior art. As will be described later, it is possible to use a three-component alloy or an alloy of four-component or more containing Au and/or Cu, which are the components to increase anti-oxidation property. A detailed description will be given below on the features of the present invention.

In the present invention, consideration is given on the point that the characteristics to reflect visible light are required on the reflective film, which is used for the reflection type liquid crystal display, and the reflectivity was determined at wavelength of 650 nm and reflection characteristics were evaluated. In the description given below, "initial reflectivity" means reflectivity (%) after the reflective film has been just deposited, and this value depends on type and amount of alloy elements contained in the alloy. The expression "the decrease of reflectivity over time" means how far (how many percent) the initial reflectivity (%) is actually decreased as the time elapses. When the rate of change over time (%) exhibits a negative value, it means that the initial reflectivity is decreased as the time elapses.

What the present inventors have found is as follows: When the reflective film is formed from an Ag-base alloy, which contains at least one element of rare earth metals in an amount of 0.1% to 3.0% ("%" used here to indicate alloy components means atom % in all cases), grain growth of Ag and coalescence of Ag atoms are suppressed. As a result, the decrease in reflectivity over time can be extensively limited. In particular, a thin-film produced by sputtering method contains many defects such as atomic voids. Then, Ag atoms are more easily moved and diffused, and this may lead to the coalescence of Ag atoms. Rare earth metals have atoms with a larger radius than that of Ag atoms. This may be helpful in suppressing the diffusion of Ag atoms and to limit the grain growth of Ag.

Rare earth metals are the elements belonging to 3A Group, and they include Sc, Y, 15 lanthanoid elements, and 15 actinoid elements. One or more of the rare earth metals may be used. When the cost and the quantity distributed for industrial application are taken into account, the use of Nd and/or Y is particularly recommended. Also, Ce may be used.

By the use of rare earth metals in an amount of 0.1% or more in total, the effects can be provided to limit the grain growth of Ag or the coalescence of Ag atoms. However, if these elements are added in an amount higher than 3.0%, these effects do not work better while the value of the initial reflectivity itself is considerably decreased. Specifically, if it is supposed that the initial reflectivity of pure Ag is "Io (pure Ag)" and the initial reflectivity of the reflective film of Ag-base alloy is "Io (Ag-base alloy)", the value of "Io (Ag-base alloy) −Io (pure Ag)", i.e. the rate of change of the initial reflectivity, can be maintained within −1.5% when the amount of the rare earth metals is kept within 2.0%. Thus, high reflectivity of the pure Ag can be maintained. Therefore, the preferable upper limit of the amount of rare earth metals is 2.0%. From the viewpoint of decreasing electrical resistivity, it is preferable to add the rare earth metals in an amount of not more than 1.0%.

On the other hand, in an experiment to reproduce and promote the environmental conditions, under which grain growth of Ag and the coalescence of Ag atoms are more likely to occur. When the reflective film is left under high temperature and high humidity conditions (80° C. and 90% relative humidity) for 48 hours, it was found that the difference between Io and Ia (i.e. the difference between the reflectivity Io (%) before the experiment and the reflectivity Ia (%) after the experiment) could be limited to 1.0% or less when Nd was present in an amount of 0.3% or more. Thus, the preferable lower limit of Nd is 0.3%. Also, the lower limit of Y is more preferably 1.0%, and this makes it possible to limit the decrease of reflectivity over time to −1.3% or lower.

Further, Au and/or Cu may be contained in the Ag-base alloy, which is used for the formation of the reflective film of the present invention. Au and Cu have the effects of suppressing the decrease in reflectivity over time by limiting oxidation of the reflective film. Also, Au has an effect of increasing corrosion-resistant property in electrolytic aqueous solution.

As the amount of Au in the Ag-base alloy, it is preferable to add Au in an amount of 0.1% to 1.5% in any of three-component alloys or alloys of four-component or more, which contains Ag, rare earth metals and Au. If this amount is lower than 0.1%, the effect to increase anti-oxidation property is decreased. As a result, the effect of suppressing the decrease in the reflectively over time of the reflective film may not be high enough. However, when the amount of Au is increased, the value of the initial reflectivity itself of the reflective film is decreased. In this respect, for the purpose of maintaining the initial high reflectivity of Ag, it is preferable to add Au in an amount of not more than 1.5%.

As an amount of Cu to be added, it is preferable to add it in an amount of 0.1% to 2.0%. Similarly to the case of Au as described above, if the added amount of Cu is lower than 0.1%, the effect of increasing an anti-oxidation property is not high enough. If it exceeds 2.0%, initial reflectivity of the reflective film is decreased.

In the preferred aspect of the present invention, the reflective film contains rare earth metals and also contains Cu and Au when necessary, and it is preferable that the remaining component is substantially Ag for the purpose of attaining high initial reflectivity. However, to the extent not to impair the effects of the present invention, the components other than the above components may be added. For instance, precious metals such as Pd, Pt, etc. or transition metals (except those already described) may be added for the purpose of improving the characteristics such as the improvement of hardness. Also, it is allowed to add gas components such as $O_2$, $N_2$, etc. or impurities (i.e. dissolved raw materials) contained in the Ag-base alloy.

The reflective film of the present invention can be optimally used for the reflection type liquid crystal display because high reflectivity can be maintained for a long time. Also, the reflective film of the present invention exhibits high resistance to structural changes such as grain growth during heating. Therefore, it is particularly suitable for the use in the liquid crystal display, which is subjected to heating process at 200° C. to 300° C. during the manufacture. Further, the reflective film is electrically conductive, and it can be used as a reflective electrode for the reflection type liquid crystal display. Also, it may be arranged as a reflector on the backside of a transparent electrode. As the electrode substrate when it is used as the reflective electrode, the substrate already known in the art such as glass substrate, plastic film substrate, etc. may be used. The same applies to the base material of the reflector. Further, it may also be used for fulfilling the functions of a reflective film and a wiring film.

To form the reflective film on the substrate or the base material, it is preferable to use the sputtering method. Cu and rare earth metals have a very low limit for solid solubility to Ag in equilibrium state (Au is turned to solid solution by 100%). The thin-film formed by the sputtering method is solid-soluble in a non-equilibrium state due to vapor quenching, which is specific to the sputtering method. Compared with the case where Ag-base alloy thin-film is formed by other thin-film forming method, uniform presence of the alloy elements is more likely to occur in an Ag matrix. As a result, anti-oxidation property is improved, and higher effect to suppress the coalescence of Ag atoms can be provided.

The thickness of the reflective film is preferably in the range of 500 Å to 3000 Å. If it is thinner than 500 Å, light passes through it, and the reflectivity is decreased. There is no problem with the reflectivity even when the thickness exceeds 3000 Å, but this is disadvantageous in terms of productivity and cost.

In the sputtering, if an Ag-base alloy with the composition described above is used as the sputtering target, it is possible to obtain a reflective film with the chemical compositions as desired. As the target, it is preferable to use an Ag-base alloy, which has been manufactured by melt-casting method. The melt Ag-base alloy is uniform in texture. The sputtering yield or the exit angle can be kept at a constant level, and the reflective film with uniform composition can be obtained. When oxygen content of the melt Ag-base alloy target is controlled to 100 ppm or lower, it is possible to easily maintain the deposition rate at a constant level, and the oxygen content in the reflective film is also decreased. This contributes to the improvement of reflectivity, an anti-oxidation property, and an anti-sulfurization property.

The reflection type liquid crystal display of the present invention fulfills the functions if it is provided with the reflective film of the present invention. There is no specific restriction on the other structure as the liquid crystal display, and any structure known in the technical field of the liquid crystal display may be adopted.

Detailed description will be given below on the present invention referring to the examples, while the present invention is not limited by these examples, and changes and modifications can be made without departing from the spirit and the scope of the present invention.

EXPERIMENT EXAMPLE 1

Study was conducted to evaluate the influence of the amount of Nd in a binary alloy comprising Ag and Nd on reflectivity. Using a target comprising the compositions shown in Table 1, a reflective film of 1500 Å in thickness was formed on a glass substrate by DC magnetron sputtering. Initial reflectivity of each specimen was determined by visible ultraviolet ray spectrophotometer (Shimadzu Corporation). The results are shown in Table 1. In Table 1, the value of "Io (Ag-base alloy) −Io (pure Ag)" is expressed as rate of change (%) of the initial reflectivity where Io (pure Ag) (%) is initial reflectivity of a reflective film containing Ag only (Nd added in an amount of 0%) and Io (Ag-base alloy) (%) is initial reflectivity measured of each specimen. Using the above specimens, an acceleration test was performed under environmental conditions where grain growth of Ag or coalescence of Ag atoms is likely to occur. In the acceleration test, a glass substrate with the reflective film formed on it was left under high temperature and high humidity conditions (80° C. and 90% relative humidity) for 48 hours, and light reflectivity Ia (%) was determined. In Table 1, the difference Ia −Io, i.e. the difference between the reflectivity after the test and the initial reflectivity Io (%) before the test, is indicated as a rate of change over time (%) of the reflectivity.

TABLE 1

| | Ag—Nd alloy | |
|---|---|---|
| Added amount of Nd (%) | Rate of change of initial reflectivity (%) | Rate of change over time of reflectivity * (%) |
| 0 | 0 | −7.0 |
| 0.1 | −0.1 | −1.3 |
| 0.3 | −0.5 | −1.0 |
| 0.5 | −0.8 | −1.0 |
| 0.7 | −1.0 | −1.0 |
| 0.9 | −1.0 | −0.8 |
| 1.0 | −1.2 | −0.7 |
| 2.0 | −1.5 | −0.5 |
| 3.0 | −2.0 | −0.5 |
| 3.5 | −2.5 | −0.5 |

* Rate of change before and after leaving the specimen under the conditions of 80° C. and 90% RH for 48 hours From the table, it is evident that the rate of change of the initial reflectivity is changed toward (−) values with the increase of the added amount of Nd and the reflectivity itself is decreased. However, when the amount of Nd is 0%, i.e. in the case of a reflective film containing Ag only, the reflectivity decreased by 7.0% when the specimen was left under high temperature and high humidity conditions. When Nd was added in an amount of 0.1%, the decrease of the reflectivity was limited to the decrease by 1.3. When Nd was added in an amount of 0.3% or more, the rate of change could be limited within 1.0%. It was confirmed that there was the effect of suppressing grain growth of Ag or coalescence of Ag atoms.

EXPERIMENT EXAMPLE 2

The experiment was performed by the same procedure on a binary alloy comprising Ag and Y, and the rate of change of initial reflectivity and the rate of change of reflectivity over time were determined. The results are shown in Table 2. The results similar to those of the experiment on Ag—Nd alloy were obtained. However, it is evident that Y's effect of suppressing the change over time was weaker compared with the case where Nd was used.

TABLE 2

| | Ag—Y alloy | |
|---|---|---|
| Added amount of Y (%) | Rate of change of initial reflectivity (%) | Rate of change over time of reflectivity * (%) |
| 0 | 0 | −7.0 |
| 0.1 | −0.1 | −1.8 |
| 0.3 | −0.5 | −1.5 |
| 0.5 | −0.8 | −1.5 |
| 0.7 | −1.0 | −1.5 |
| 0.9 | −1.0 | −1.4 |
| 1.0 | −1.2 | −1.3 |

TABLE 2-continued

Ag—Y alloy

| Added amount of Y (%) | Rate of change of initial reflectivity (%) | Rate of change over time of reflectivity * (%) |
|---|---|---|
| 2.0 | −1.5 | −1.0 |
| 3.0 | −2.0 | −1.0 |
| 3.5 | −2.5 | −1.0 |

* Rate of change before and after leaving the specimen under the conditions of 80° C. and 90% RH for 48 hours

EXPERIMENT EXAMPLE 3

The experiment was performed by the same procedure on a binary alloy comprising Ag and Ce, and the rate of change on initial reflectivity and the rate of change over time of reflectivity were determined. The results are shown in Table 3. The results were similar to those of Ag—Nd alloy. However, it is evident that Ce's effect of suppressing the rate of change over time was weaker than that of Nd.

TABLE 3

Ag—Ce alloy

| Added amount of Ce (%) | Rate of change of initial reflectivity (%) | Rate of change over time of reflectivity * (%) |
|---|---|---|
| 0 | 0 | −7.0 |
| 0.1 | −0.1 | −2.0 |
| 0.3 | −0.5 | −1.7 |
| 0.5 | −0.8 | −1.7 |
| 0.7 | −1.0 | −1.7 |
| 0.9 | −1.0 | −1.6 |
| 1.0 | −1.2 | −1.5 |
| 2.0 | −1.5 | −1.2 |
| 3.0 | −2.0 | −1.2 |
| 3.5 | −2.5 | −1.2 |

* Rate of change before and after leaving the specimen under the conditions of 80° C. and 90% RH for 48 hours

EXPERIMENT EXAMPLE 4

On a three-component alloy of Ag—Nd—Au, the added amount of Au was changed to various values, and reflective films were formed by the same procedure as in Experiment Example 1. The amount of Nd was fixed to 0.7%. By the same procedure as in Experiment Example 1, the rate of change of initial reflectivity and the rate of change over time (%) under high temperature and high humidity conditions were evaluated. The results are shown in Table 4.

TABLE 4

Ag—Nd—Au alloy

| Added amount of Au (%) | Rate of change of initial reflectivity (%) | Rate of change over time of reflectivity * (%) |
|---|---|---|
| 0 | −1.0 | −1.0 |
| 0.1 | −1.0 | −0.8 |
| 0.9 | −1.2 | −0.7 |
| 1.0 | −1.2 | −0.7 |

TABLE 4-continued

Ag—Nd—Au alloy

| Added amount of Au (%) | Rate of change of initial reflectivity (%) | Rate of change over time of reflectivity * (%) |
|---|---|---|
| 1.5 | −1.5 | −0.3 |
| 2.0 | −2.0 | −0.3 |

* Rate of change before and after leaving the specimen under the conditions of 80° C. and 90% RH for 48 hours

EXPERIMENT EXAMPLE 5

On a three-component alloy of Ag—Nd—Cu, the amount of Nd was fixed to 0.7% as in Experiment Example 4, and study was conducted on the influence of Cu. The rate of change (%) of initial reflectivity and the rate of change over time (%) of reflectivity were evaluated by the same procedure as in Experiment Example 1. The results are shown in Table 5.

TABLE 5

Ag—Nd—Cu alloy

| Added amount of Cu (%) | Rate of change of initial reflectivity (%) | Rate of change over time of reflectivity * (%) |
|---|---|---|
| 0 | −1.0 | −1.0 |
| 0.1 | −1.0 | −0.8 |
| 0.9 | −1.2 | −0.8 |
| 1.0 | −1.2 | −0.7 |
| 2.0 | −1.5 | −0.4 |
| 3.0 | −2.0 | −0.4 |

* Rate of change before and after leaving the specimen under the conditions of 80° C. and 90% RH for 48 hours

EXPERIMENT EXAMPLE 6

Using a four-component alloy of Ag—Cu—Au—Nd, the added amount of Nd was changed to various values, and reflective films were formed by the same procedure as in Experiment Example 1. The amounts of Cu and Au were fixed to 1.0% respectively. By the same procedure as in Experiment Example 1, the rate of change (%) of initial reflectivity and the rate of change over time (%) of reflectivity were determined. The results are shown in Table 6.

TABLE 6

Ag - 1.0 Cu - 1.0 Ag—Nd alloy

| Added amount of Nd (%) | Rate of change of initial reflectivity (%) | Rate of change over time of reflectivity * (%) |
|---|---|---|
| 0 | −0.9 | −1.3 |
| 0.1 | −0.1 | −1.0 |
| 0.3 | −0.5 | −0.8 |
| 0.5 | −0.8 | −0.8 |
| 0.7 | −1.0 | −0.8 |
| 1.0 | −1.2 | −0.6 |
| 2.0 | −1.5 | −0.3 |
| 3.0 | −2.0 | −0.3 |
| 3.5 | −2.5 | −0.3 |

* Rate of change before and after leaving the specimen under the conditions of 80° C. and 90% RH for 48 hours When the added amount of Nd was increased, the rate of change of initial reflectivity was increased and reflectivity was decreased. The rate of change over time by an acceleration test was decreased, and it was confirmed that the effect of suppressing grain growth of Ag and coalescence of Ag atoms was obtained.

EXPERIMENT EXAMPLE 7

Using a four-component alloy of Ag—Cu—Au—Y, the added amount of Y was changed to various values, and reflective films were formed by the same procedure as in Experiment Example 1. The amounts of Cu and Au were fixed to 1.0% respectively. By the same procedure as in Experiment Example 1, the rate of change (%) of initial reflectivity and the rate of change over time of reflectivity (%) were determined. The results are shown in Table 7.

TABLE 7

Ag - 1.0 Cu - 1.0 Au—Y alloy

| Added amount of Y (%) | Rate of change of initial reflectivity (%) | Rate of change over time of reflectivity * (%) |
|---|---|---|
| 0 | −0.9 | −1.3 |
| 0.1 | −1.0 | −0.8 |
| 1.0 | −1.2 | −0.7 |
| 2.0 | −1.5 | −0.5 |
| 3.0 | −2.0 | −0.5 |
| 3.5 | −2.5 | −0.5 |

* Rate of change before and after leaving the specimen under the conditions of 80° C. and 90% RH for 48 hours When the added amount of Y was increased, the rate of change of initial reflectivity was increased, and reflectivity was decreased. However, the rate of change over time was decreased, and it was confirmed that the effect of suppressing grain growth of Ag and coalescence of Ag atoms was provided.

EXPERIMENT EXAMPLE 8

Using the targets with compositions of pure Ag, Ag −0.9 Cu −1.0 Au and Ag −0.3 Nd −0.7 Cu were used, and thin-films of 100 nm in thickness were formed by sputtering on a glass substrate respectively. For the specimen immediately after film-forming, for the specimen processed by heat treatment at 100° C. for 10 minutes under vacuum condition, and for the specimen processed by heat treatment at 200° C. for 10 minutes under vacuum condition, grain growth (microstructure) was examined with a transmission electron microscope (TEM) (Hitachi Ltd.; HF-2000). TEM images are shown in FIGS. 1 to 3.

Figure 2:
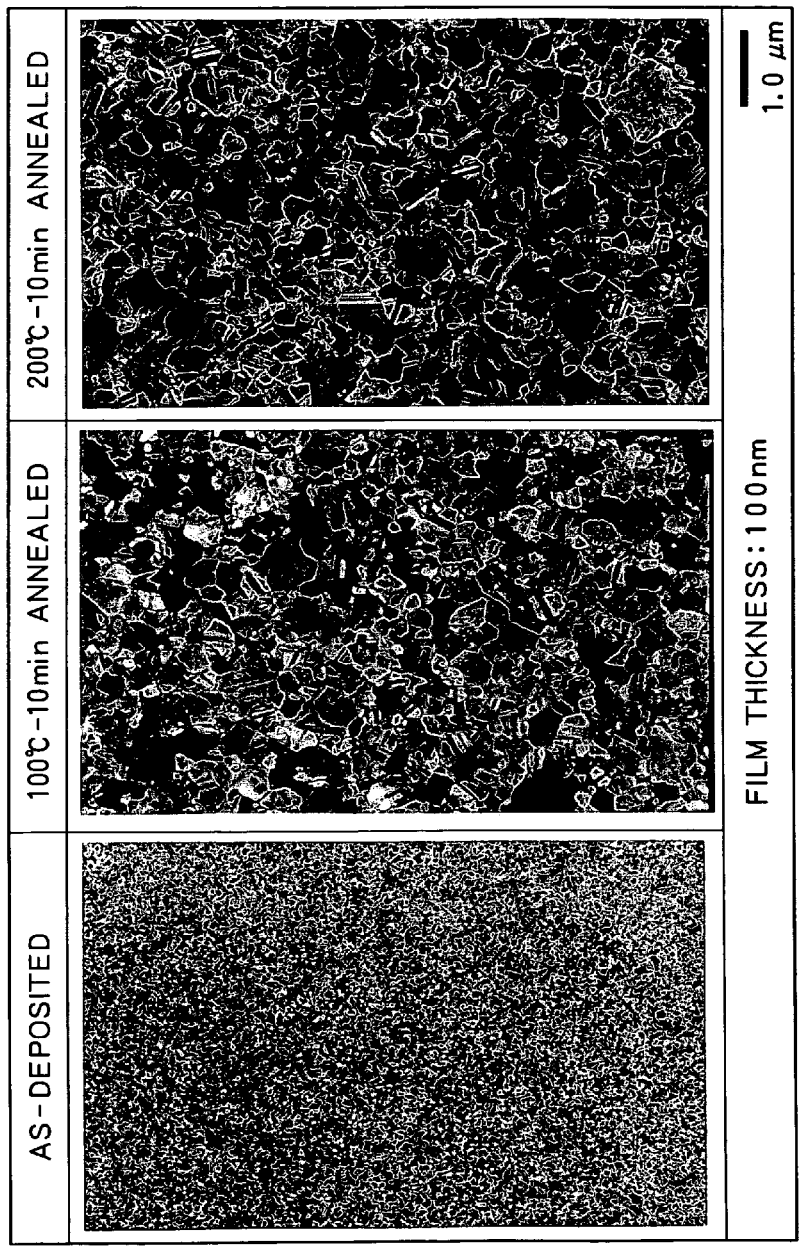
FIG. 2 shows transmission electron micrographs (TEM) images showing microstructure of a three-component alloy thin-film comprising Ag-0.9 Cu-1.0 Au.
Figure 3:
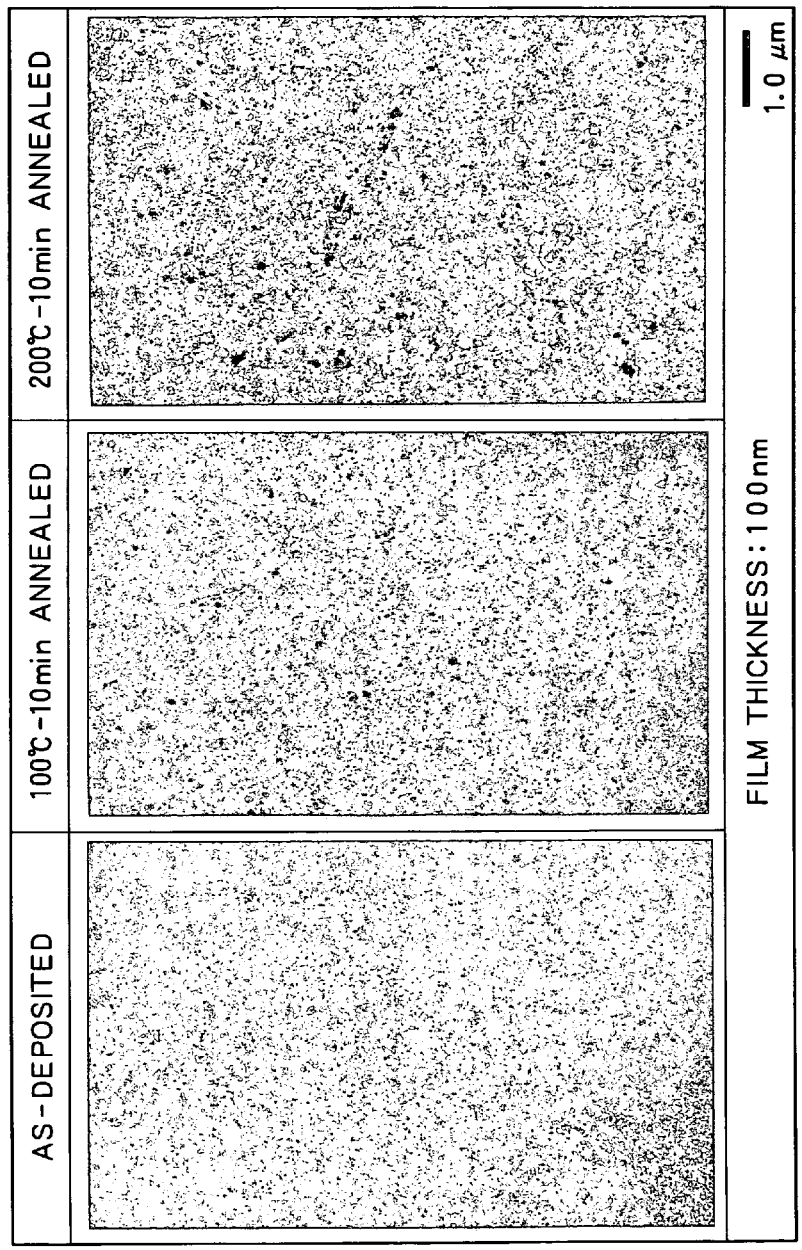
FIG. 3 shows transmission electron micrographs (TEM) images showing microstructure of a three-component alloy thin-film comprising Ag-0.3 Nd-0.7 Cu.

As it is evident from FIG. 1 and FIG. 2, in the case of pure Ag and Ag −0.9 Cu −1.0 Au, crystal grains were enlarged due to heat treatment. In the case of the Ag −0.3 Nd −0.7 Cu of FIG. 3, there was almost no change in grain size, and it is evident that grain growth of Ag was suppressed by the addition of Nd.

Figure 4:
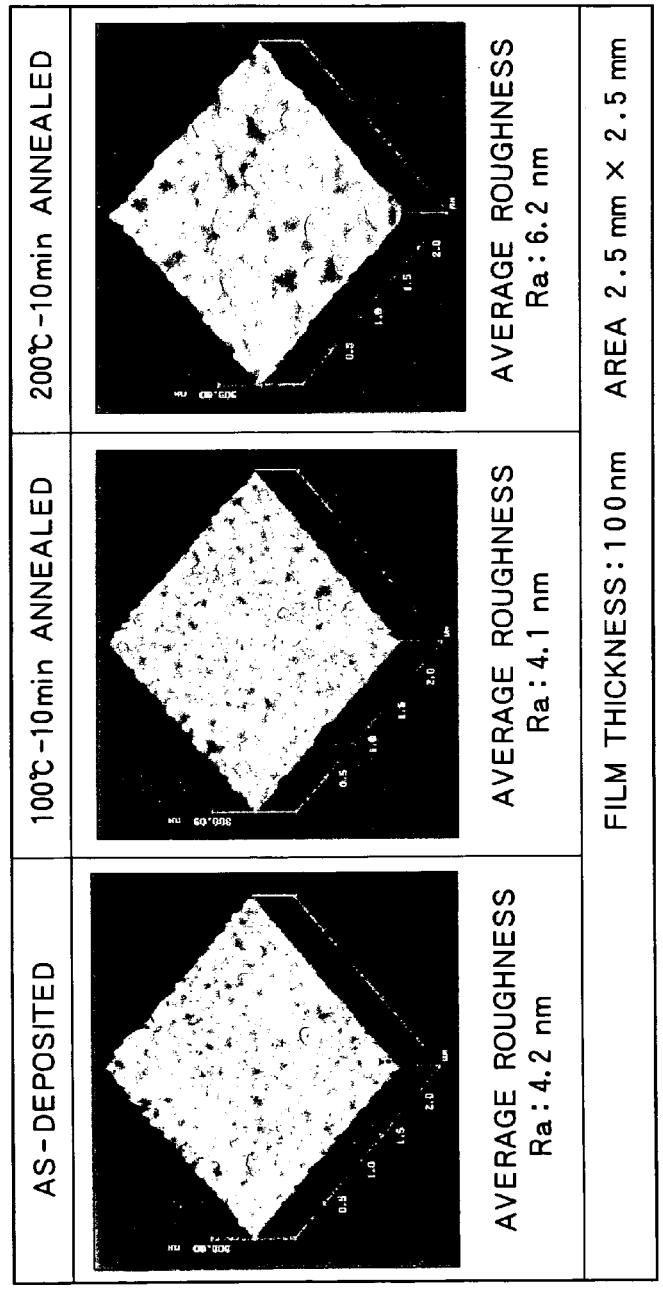
FIG. 4 represents atomic force micrographs (AFM) images showing surface morphology of a pure Ag thin-film.
Figure 5:
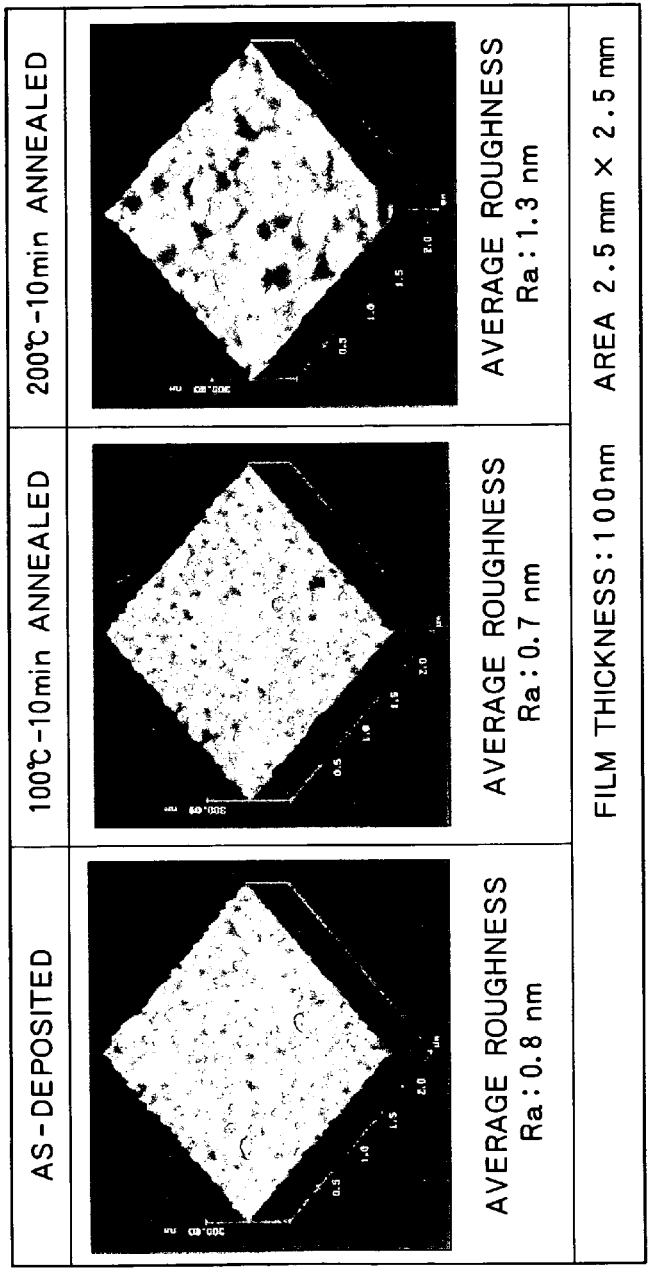
FIG. 5 represents atomic force micrographs (AFM) images showing surface morphology of a three-component alloy thin-film comprising Ag-0.9 Cu-1.0 Au.
Figure 6:
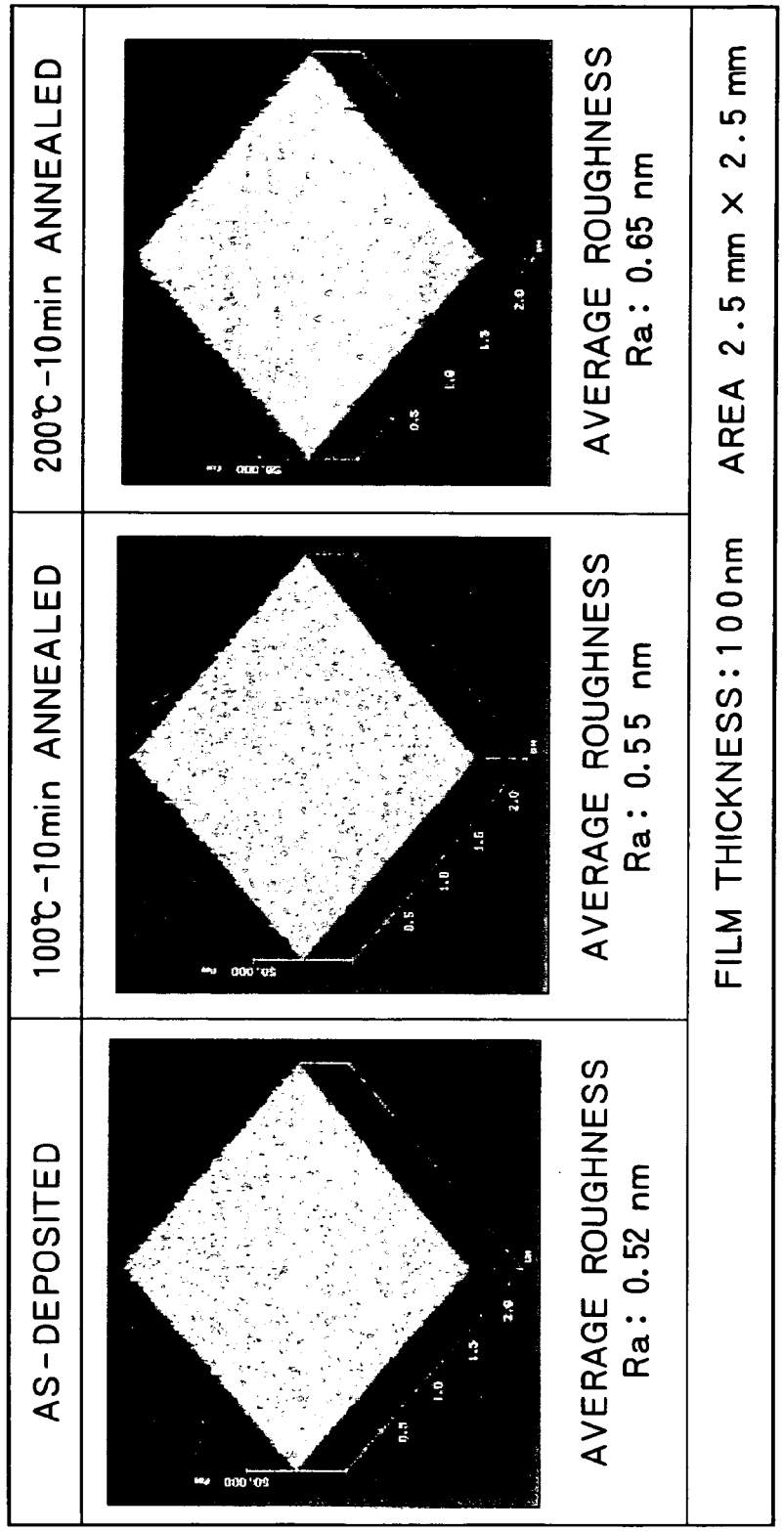
FIG. 6 represents atomic force micrographs (AFM) images showing surface morphology of a three-component alloy thin-film comprising Ag-0.3 Nd-0.7 Cu.

Also, for the specimen immediately after film-forming, for the specimen processed by heat treatment at 100° C. for 10 minutes under vacuum condition, and for the specimen processed by heat treatment at 200°C. for 10 minutes under vacuum condition, surface morphology were examined with an atomic force microscope (AFM) (Topometrix Inc.; TMX2000). AFM images are shown in FIG. 4 to FIG. 6. Average surface roughness (Ra) is shown in each figure.

As it is apparent from FIG. 4 and FIG. 5, in the case of the pure Ag and the Ag −0.9 Cu −1.0 Au without containing Nd, surface roughness was extensively increased due to heat treatment. In the case of the Ag −0.3 Nd −0.7 Cu shown in FIG. 6, there was almost no change in surface roughness, and it is evident that coalescence of Ag atoms was suppressed by addition of Nd.

The reflective film according to the present invention is formed from an Ag-base alloy, in which rare earth metals are added to Ag, and grain growth of Ag and coalescence of Ag atoms can be limited and suppressed. As a result, it is possible to reduce the decrease in reflectivity over time while maintaining initial high reflectivity of Ag. If Cu and/or Au are simultaneously used, anti-oxidation property is increased, and it is possible to reduce the decrease in reflectivity over time. Therefore, when the reflective film of the present invention is applied to the reflection type liquid crystal display, it is possible to form an image, which is brighter and easier to look at. Also, the sputtering target of the present invention can be preferably used for forming the reflective film having good performance characteristics as described above.

The foregoing invention has been described in terms of preferred embodiments. However, those skilled, in the art will recognize that many variations of such embodiments exist. Such variations are intended to be within the scope of the present invention and the appended claims.

LIST OF RELATED CASES

| Docket Number | Serial or Patent No. | Filing or Issue Date | Status or Patentee |
|---|---|---|---|
| 0023-1236-0 DIV | 5,500,301 | Mar. 19, 1996 | ONISHI, et al. |
| 0023-1538-0 DIV | 5,976,641 | Nov. 02, 1999 | ONISHI, et al. |
| 0023-1723-0 CONT | 6,206,985 | Mar. 27, 2001 | ONISHI, et al. |
| 0023-1292-0 | 6,333,267 | Dec. 25, 2001 | ONISHI, et al. |
| 0023-1249-0 | 5,514,909 | May 07, 1996 | YAMAMOTO, et al. |
| 0023-1361-0 DIV | 6,033,542 | May 07, 2000 | YAMAMOTO, et al. |
| PER CLIENT | 6,096,438 | Dec. 25, 2001 | TAKAGI, et al. |
| PER CLIENT | 6,387,536 | May 14, 2002 | TAKAGI, et al. |
| PER CLIENT | 6,007,889 | Dec. 28, 1999 | NEE |
| PER CLIENT | 6,280,811 | Aug. 28, 2001 | NEE |
| 215247US0 | 09/983,305 | Oct. 24, 2001 | PENDING |

What is claimed is:

1. A reflective film comprising a Ag-based alloy which comprises:
   Au in an amount of 0.1 atom % to 1.5 atom % and
   0.1 atom % to 2.0 atom % of a rare earth metal comprising Nd, Y, or both Nd and Y;
   wherein said reflective film is capable of functioning as a reflective electrode or a reflector in a reflection type liquid crystal display.

2. The reflective film according to claim 1, wherein the rare earth metal comprises Nd.

3. The reflective film according to claim 1, wherein said Ag-base alloy further comprises Cu in an amount of 0.1 atom % to 2.0 atom %.

4. A reflection type liquid crystal display, comprising the reflective film as claimed in claim 1.

5. The reflective film according to claim 1, wherein the rare earth metal comprises Y.

6. The reflective film according to claim 1, wherein the rare earth metal further comprises a metal selected from the group consisting of Sc, La, Ce, Pr, Pm, Sm, Eu, Gd, Tb, Dy, Ho, Er, Tm, Yb, Lu and mixtures thereof.

7. A sputtering target for forming the reflective film as claimed in claim 1 on a substrate, wherein said target comprises a Ag-based alloy comprising Au in an amount of 0.1 atom % to 1.5 atom % and 0.1 atom % to 2.0 atom % of a rare earth metal comprising Nd, Y, or both Nd and Y.

8. The sputtering target according to claim 7, wherein the rare earth metal comprises Nd.

9. The sputtering target according to claim 7, wherein said Ag-base alloy further comprises Cu in an amount of 0.1 atom % to 2.0 atom %.

10. The sputtering target according to claim 7, wherein the rare earth metal comprises Y.

11. The sputtering target according to claim 7, wherein the rare earth metal further comprises a metal selected from the group consisting of Sc, La, Ce, Pr, Pm, Sm, Eu, Gd, Tb, Dy, Ho, Er, Tm, Yb, Lu and mixtures thereof.

12. A reflective film comprising a Ag-based alloy which comprises

Cu in an amount of 0.1 atom % to 2.0 atom % and 0.1 atom % to 2.0 atom % of a rare earth metal comprising Nd, Y, or both Nd and Y;

wherein said reflective film is capable of functioning as a reflective electrode or a reflector in a reflection type liquid crystal display.

13. The reflective film according to claim 12, wherein the rare earth metal comprises Nd.

14. The reflective film according to claim 12, wherein said Ag-base alloy further comprises Au in an amount of 0.1 atom % to 1.5 atom %.

15. A reflection type liquid crystal display, comprising the reflective film as claimed in claim 12.

16. The reflective film according to claim 12, wherein the rare earth metal comprises Y.

17. The reflective film according to claim 12, wherein the rare earth metal further comprises a metal selected from the group consisting of Sc, La, Ce, Pr, Pm, Sm, Eu, Gd, Tb, Dy, Ho, Er, Tm, Yb, Lu and mixtures thereof.

18. A sputtering target for forming the reflective film as claimed in claim 12 on a substrate, wherein said target comprises a Ag-based alloy comprising Cu in an amount of 0.1 atom % to 2.0 atom % and 0.1 atom % to 2.0 atom % of a rare earth metal comprising Nd, Y, or both Nd and Y.

19. The sputtering target according to claim 18, wherein the rare earth metal comprises Nd.

20. The sputtering target according to claim 18, wherein said Ag-base alloy further comprises Au in an amount of 0.1 atom % to 1.5 atom %.

21. The sputtering target according to claim 18, wherein the rare earth metal comprises Y.

22. The sputtering target according to claim 18, wherein the rare earth metal further comprises a metal selected from the group consisting of Sc, La, Ce, Pr, Pm, Sm, Eu, Gd, Tb, Dy, Ho, Er, Tm, Yb, Lu and mixtures thereof.

* * * * *